(12) United States Patent
Shackleton et al.

(10) Patent No.: US 7,970,038 B2
(45) Date of Patent: Jun. 28, 2011

(54) SLAB LASER WITH STAND-OFF FOR CERAMIC SPACERS

(75) Inventors: Christian J. Shackleton, Granby, CT (US); Raul Martin Wong Gutierrez, Windsor, CT (US)

(73) Assignee: Coherent, Inc., Santa Clara, CA (US)

( * ) Notice: Subject to any disclaimer, the term of this patent is extended or adjusted under 35 U.S.C. 154(b) by 358 days.

(21) Appl. No.: 12/166,640

(22) Filed: Jul. 2, 2008

(65) Prior Publication Data

US 2009/0034574 A1 Feb. 5, 2009

Related U.S. Application Data

(60) Provisional application No. 60/962,555, filed on Jul. 30, 2007.

(51) Int. Cl.
*H01S 3/03* (2006.01)
(52) U.S. Cl. .............. 372/61; 372/64; 372/65; 372/55
(58) Field of Classification Search ............ 372/61, 372/64, 65, 55
See application file for complete search history.

(56) References Cited

U.S. PATENT DOCUMENTS

| | | | |
|---|---|---|---|
| 5,140,606 A | 8/1992 | Yarborough et al. | 372/64 |
| 5,216,689 A | 6/1993 | Gardner et al. | 372/87 |
| 6,788,722 B1 | 9/2004 | Kennedy et al. | 372/64 |
| 7,260,134 B2 | 8/2007 | Shackleton et al. | 372/87 |
| 7,263,116 B2 | 8/2007 | Shackleton et al. | 372/64 |
| 2003/0058913 A1* | 3/2003 | Shackleton et al. | 372/55 |
| 2005/0175054 A1* | 8/2005 | Shackleton et al. | 372/55 |
| 2007/0195839 A1* | 8/2007 | Monty et al. | 372/38.05 |

FOREIGN PATENT DOCUMENTS

JP 2000-269569 9/2000

OTHER PUBLICATIONS

U.S. Appl. No. 12/079,296, filed Mar. 26, 2008, by Leon A. Newman, entitled "RF Excited $CO_2$ Slab Laser Tube Elousing and Electrodes Cooling," 28 pages in length.
J. Xin et al., "Radio frequency discharge excited diffusively cooled kilowatt carbon monoxide slab waveguide laser with a three mirror resonator,"*Applied Physics Letters*, vol. 75, No. 10, Sep. 6, 1999, pp. 1369-1370.

* cited by examiner

*Primary Examiner* — Kinam Park
(74) *Attorney, Agent, or Firm* — Morrison & Foerster LLP

(57) ABSTRACT

An RF excited gas discharge laser is disclosed including a housing holding the lasing gas. An electrode assembly is mounted within the housing. The electrode assembly includes a pair of elongated planar electrodes mounted in face to face relationship with a narrow gap therebetween. A pair of planar dielectric plates are positioned along the side edges of the gap to seal the discharge region. The plates extend part of the way into the gap from both sides edges of the electrodes. The inner surfaces of the electrodes are provided with an opposed trench in the region surrounding the inner edges of the plates. In this way, the exposure of the inner edges of the plates to the discharge is minimized improving performance.

10 Claims, 4 Drawing Sheets

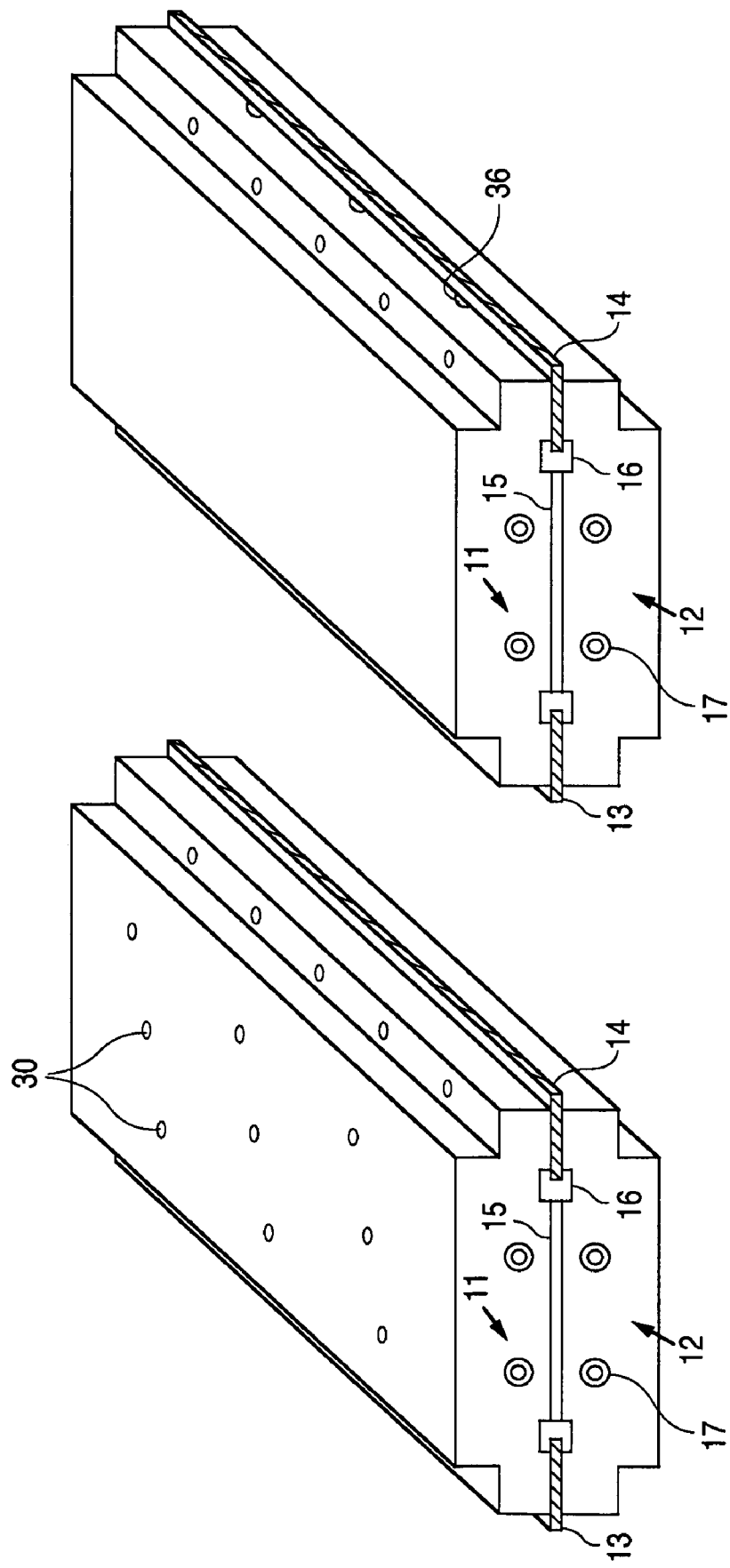

SLAB LASER WITH STAND-OFF FOR CERAMIC SPACERS

PRIORITY

This application claims priority from U.S. Provisional Application Ser. No. 60/962,555 filed Jul. 30, 2007, the disclosure of which is incorporated herein in its entirety.

TECHNICAL FIELD

This invention relates to RF excited carbon dioxide slab lasers.

BACKGROUND

There have been significant developments in RF excited, diffusion cooled, sealed-off slab lasers. These lasers typically include a housing containing a laser gas. A pair of elongated, planar electrodes are disposed with the housing. The electrodes are spaced mounted in face to face relationship and spaced apart to define a narrow gap corresponding to the discharge region. Mirrors are positioned at the ends of the electrodes to define the resonator. A basic slab laser design is disclosed in commonly owned U.S. Pat. No. 5,140,606 incorporated herein by reference.

In some of the slab laser designs, it has been found desirable to include dielectric members along the edges of the electrodes. One basic design can be found in an article by Xin, et al., "RF Discharge Excited Diffusively Cooled KW CO Slab Waveguide Laser with a Three Mirror Resonator" (Appl. Phys. Letters, p 1369, 6 Sep. 1999). FIG. 1 herein corresponds in some respects to the electrode structure illustrated in FIG. 2 of the Xin paper. The electrode structure includes a pair of rectangular planar electrodes 1 and 2. Electrode 1 is the hot electrode and electrode 2 is the ground electrode. The electrodes are typically made from aluminum. An opposed pair of dielectric plates 3 and 4 are positioned in the gap between the electrodes. The outer edges of the plates extend beyond the edges of the electrodes. The inner edges of the plates extend part of the way into the discharge gap. The region between the electrodes and the inner edges of the plates defines a slab shaped discharge region 5. The plates and the electrodes function to enclose the discharge except at the two ends thereof. The plates are typically made from an alumina ceramic material.

In a preferred embodiment found in some prior art designs, the ends of the electrodes can be provided with ceramic blocks 6 and 7 that extend the optical waveguide between the shorter hot electrode and the longer ground electrode (see, commonly owned U.S. Pat. No. 5,216,689 incorporated herein by reference). The ceramic blocks act as the dielectric laser waveguide extensions to increase the efficiency of the laser by reducing optical losses caused by the laser mode leaving the waveguide aperture, propagating a distance in free space, and then reflected back into the waveguide aperture. The longer the distance the laser mode propagates in free space, the higher the mode matching losses become. Extending the waveguide as shown in FIG. 1 reduces such losses.

More importantly is the fact that extending the waveguide with a dielectric also increases the laser lifetime by keeping the discharge away from the optical resonators mirrors, thereby preventing damage to the mirrors from the UV radiation generated by the discharge. With the ceramic extended waveguide, the discharge essentially stops at the end of the hot electrodes, which is shorter than the ground electrode.

The assembly is excited from an RF power source 8. The power source excites the discharge creating laser light. Details concerning the preferred method of mounting the electrodes, the cooling of the electrodes and their placement within a hermetically sealed laser tube housing are described in U.S. application Ser. No. 12/079,296, filed Mar. 26, 2008, incorporated herein by reference.

Enclosing the discharge with dielectric strips helps eliminates acoustic coupling between the discharge region and the structures outside the discharge regions. We have observed that as the laser discharge pulse repetition frequency (PRF) passed thorough an acoustic resonance region of the laser tube housing structure, regions within the discharge began to vary in intensity and these regions began to move around. Such discharge non-uniformity affected both the output beam pointing and amplitude stability. We believe this beam movement is caused by the alternating pressure gradients associated with the acoustic resonances. We observed that enclosing the discharge between the two dielectric strips prevented acoustic coupling of the pulsed discharge with the structures outside the discharge regions thereby minimizing or preventing the development of some of the acoustic resonances affects. This approach improved pointing stability as a function of varying RF pulsed repetition frequency and pulsed duty cycle. Reducing the acoustic resonances within the discharge region also improved the discharge stability and therefore reduced the variation in the power output of the laser.

Although the structure shown in FIG. 1 worked, it was found that having the discharge interact with the inner edges of the plates can cause problems with lifetime and laser stability. The subject invention is intended to address those concerns.

Further information about slab lasers and dielectric spacers can be found in commonly owned U.S. Pat. Nos. 7,260,134 and 7,263,116, both of which are incorporated herein by reference.

Further advantages of the subject invention will be discussed below in conjunction with the drawings in which:

BRIEF DESCRIPTION OF THE DRAWINGS

FIGS. 4A and 4B are perspective views of alternate embodiments of the subject invention.

DETAILED DESCRIPTION OF THE PREFERRED EMBODIMENTS

Figure 1:
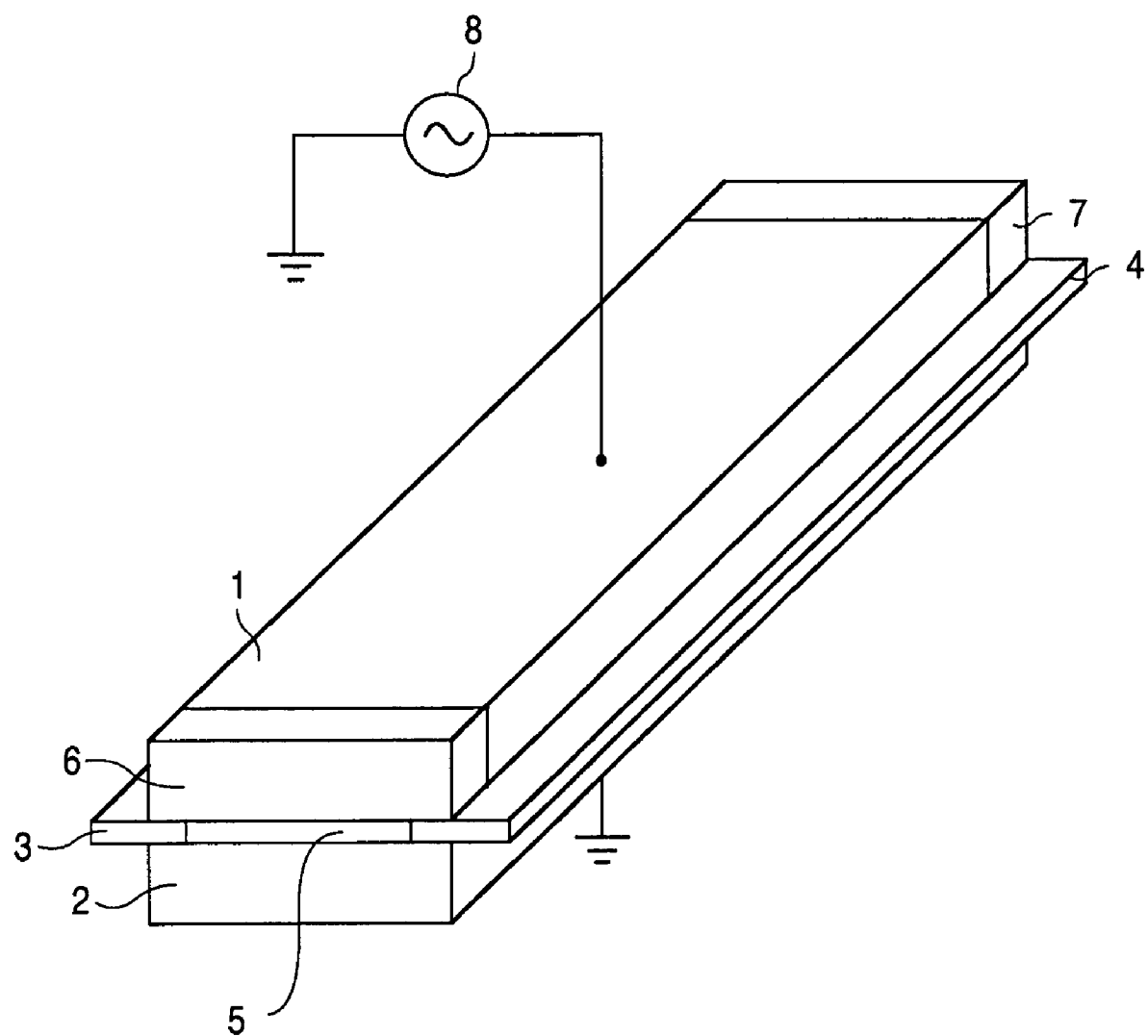
FIG. 1 is a perspective view of a prior art electrode assembly.
Figure 2:
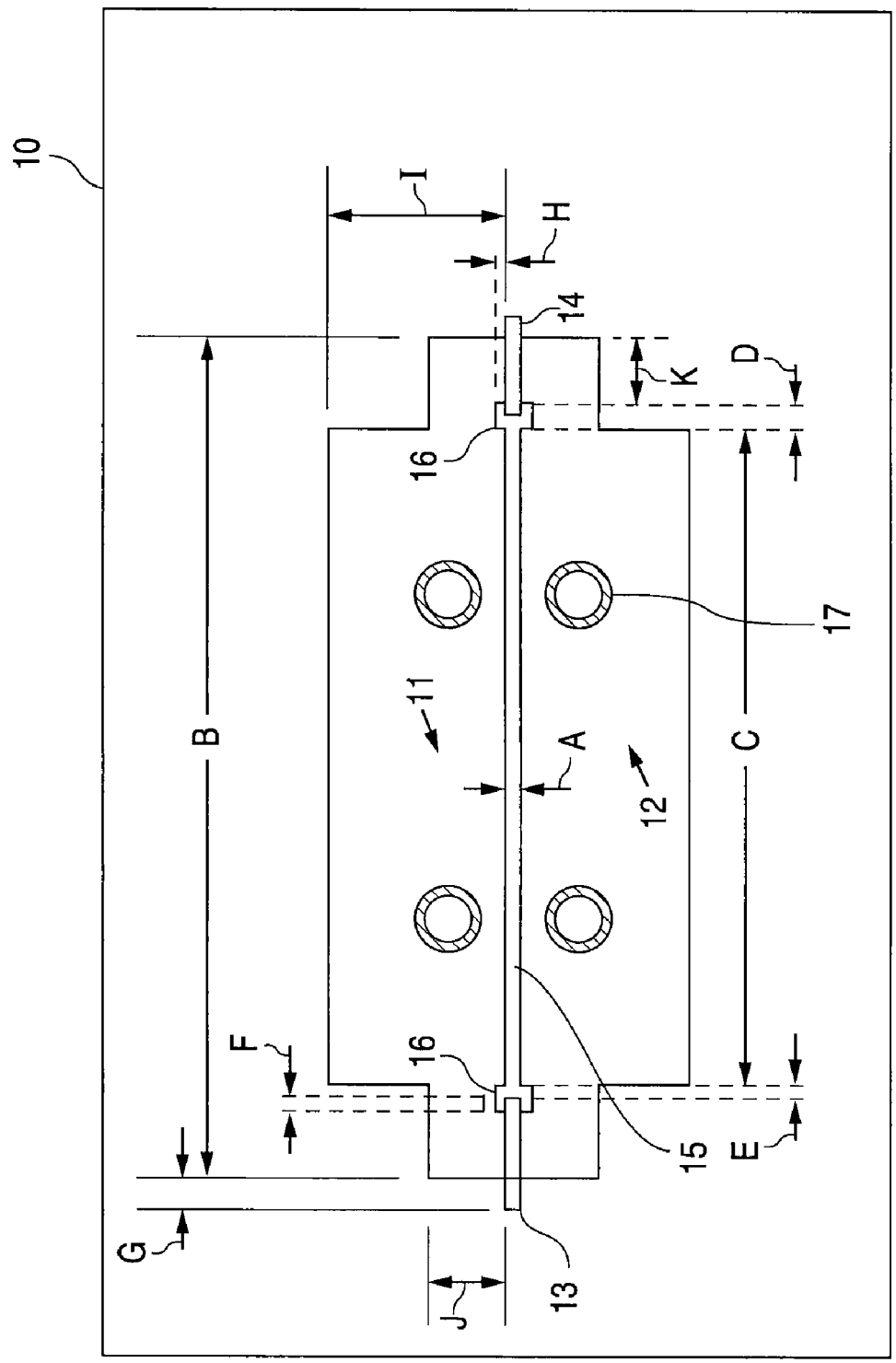
FIG. 2 is a simplified cross-sectional view of an electrode assembly illustrating the subject invention.

FIG. 2 is a cross-sectional end view of an electrode assembly showing the basic features of the invention. The electrodes are mounted within a housing 10. The electrode assembly includes two parallel facing metal electrodes where electrode 11 is the hot electrode and electrode 12 is the ground electrode. Both electrodes have an over-all width "B" and a shorter width portion "C". The electrodes are separated by an amount "A". This gap separation "A" is maintained by inserting identical ceramic plates or spacers 13 and 14 which run down the length of both sides of the electrode assembly. The gap A in the region C defines a slab shaped discharge region 15.

At each end of the length "C" of each electrode, an identical rectangular trench 16 is machined in the surface of the electrode. The trench 16 has a depth "H" and a width "D". The ceramic strip protrudes into this trench by an amount F where F is about equal to ½ D. In this manner each of the ceramic strips are spaced a distance E (about equal to=½D), from the discharge region 15.

The distance F is selected so the radio frequency (RF) surface impedance of the ceramic spacers 13 and 14 over a surface length "2F+H" is much greater than the discharge impedance across the height of the trenches having a dimension "2H+A". The optimum lengths of these surfaces required to prevent arcing along these surfaces are dependent on the RF frequency, gas composition, pressure, etc. In the preferred embodiment, the outer edges of the spacers extend beyond the side edges of the electrodes. The length G by which the spacers extend past the metal electrodes is typically the same as the distance "F" for the same impedance reason. Having these surface impedances larger than the discharge impedance in gap "A" prevents a discharge from being generated within the trenches and insures that nearly all the RF energy goes into generating the discharge in region 15.

The trenches define a stand-off region which prevents the discharge from coming into contact with the ceramic strip spacers and also tend to minimizes glancing reflection of laser radiation from the sides of the ceramic strips that extend down the length of the electrodes, thereby preventing the generation of higher order laser modes. The trenches in the electrodes and their beneficial effects on CO2 slab laser output performance over the prior art are an important contribution over the prior art.

Items 17 of FIG. 2 are the cooling passages that are "gun-drilled" into the two electrodes. Gun drilling was pioneered in the gun industries as a low cost manufacturing approach of gun barrels. Copper tubes are inserted into the drilled passages and then hydrostatically expanded to insure excellent thermal transfer from the electrode, through the copper tube and into the cooling fluid. The use of copper enables the use of water as the coolant without the addition of an inhibitor to prevent corrosion.

The thickness "I" and "J" of FIG. 2 are sufficiently thick so the electrodes are rigid and do not deflect when the gas pressure rapidly rises after the pulsed RF power is turned on. Preventing the dimensions of the electrode gap from changing prevents the waveguide loss from increasing while maintaining a good output mode quality for the waveguide portion of the hybrid waveguide/unstable resonator typically used in gas slab lasers.

Figure 3:
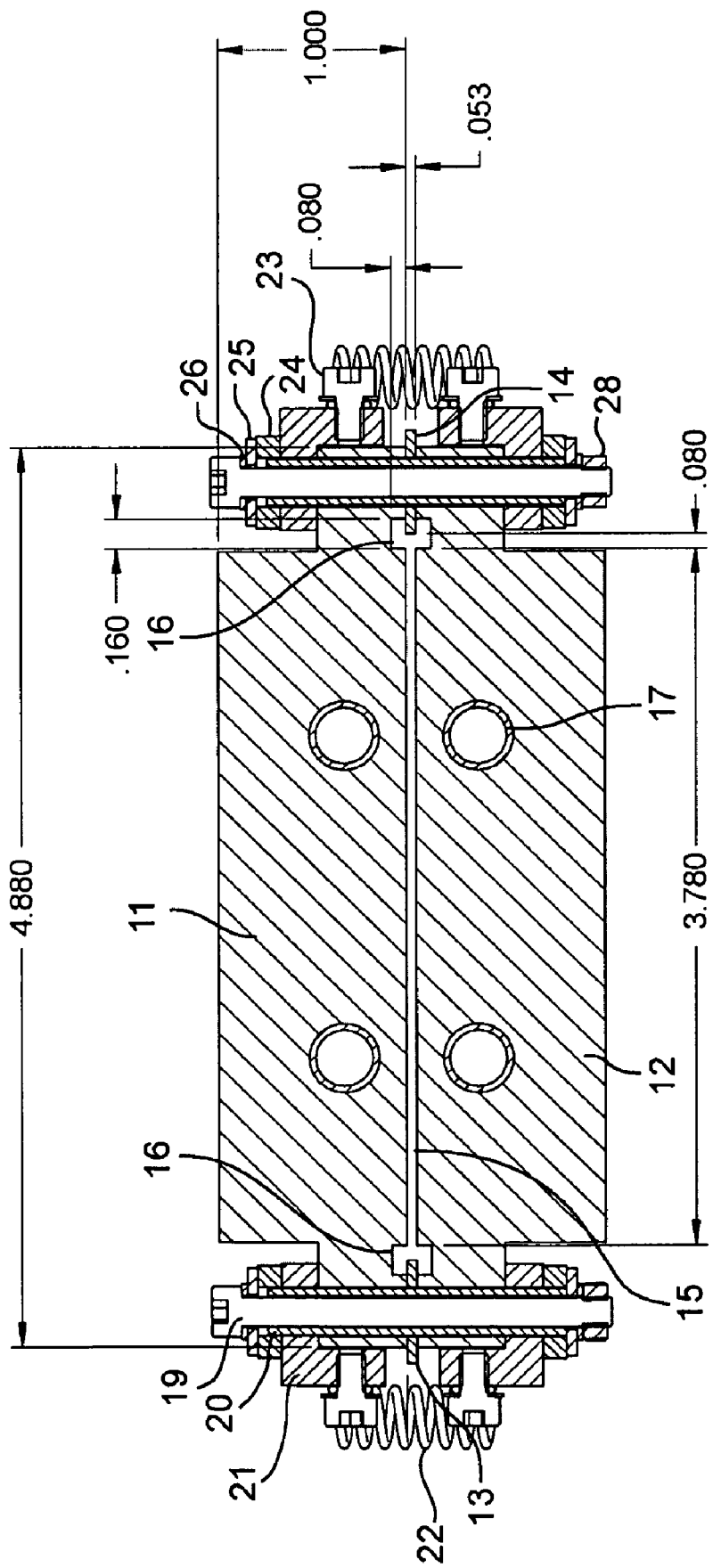
FIG. 3 is a more complete cross-sectional view of an electrode assembly illustrating the subject invention.

FIG. 3 illustrates another cross-sectional end view showing typical dimensions for the electrodes. The electrodes are held together and pressed against the ceramic spacers 13 and 14 by the bolt 19 which is inserted through a metal spring washer 26, a metal flat washer 25 and a ceramic spacer 24, a metal collar 21 and through a ceramic sleeve 20, through holes provided in the ceramic strips 13 and 14 and finally bolted together by nut 28.

Items 22 are inductors connected across the two electrodes and spaced down the length of both sides of the two electrodes to insure uniform voltage excitation and thereby uniform discharge excitation down the length of the two electrodes as is well known in the state-of-the-art of diffusion cooled, RF excited, sealed-off CO2 lasers. The inductors 22 are connected to the metal collars 21 which are in electrical contact to the hot and ground electrodes by screws 23.

The dimensions shown in FIG. 3 are in inches and are representative of dimensions that are relatively wider and shorter than is typical of a pulsed 400 W output average power CO2 slab laser (i.e., the Coherent Diamond E-400 lasers operating at 100 Torr pressure and 100 MHz). These dimensions can change for other laser power levels.

The rubbing of aluminum and alumina parts of the electrode assembly can generate $Al_2O_3$ particles which can reduce the lifetime of hermetically sealed, diffusion cooled $CO_2$ lasers. Consequently such rubbing should be minimized. These particles can become heated within the laser cavity, find their way to the mirrors and eventually damage the laser mirrors, thereby shortening lifetime.

To reduce the rubbing of the ceramic parts (i.e., ceramic spacers 24 against the metal collar 21, and electrodes 11 and 12 rubbing against ceramic spacers 13 and 14) caused by movement of the two electrodes and the two ceramic strips by the pressure generated when the discharged is pulsed, small air vent holes can be drilled in the surface of one or both of the two electrodes. One example of one of many possible patterns of such pressure release ports 30 is shown in FIG. 4A. The small diameter of the holes 30 (i.e., say between ¹⁄₁₆ to ⅛ diameter) and the relative low number of holes per unit length (i.e., say one hole per one-half foot to one foot of electrode length for example) insures that the waveguide losses generated by the holes are insignificant. The effect on the stiffness reduction of the electrodes can be reduced by stagger-positioning of the holes down the length of one or both of the electrodes. In addition to minimizing the rubbing, the pressure release ports also minimize variations in the gap dimensions which would affect the waveguiding of the hybrid waveguide/unstable resonator.

Another example for providing pressure release ports to minimize changes in the gap "A" dimension of FIG. 2 and the rubbing of the ceramic/aluminum parts under pulsed discharge conditions is illustrated in FIG. 4B. In the approach illustrated in FIG. 4B, thin pressure release slits 36 are cut into the surface of one or both of the surfaces of the electrodes in contact with the ceramic spacers. The slits extend only across the portion of the electrodes in contact with the ceramic strips and terminate at the trench (see distance K in FIG. 2). The ceramic strip acts as part of the wall of the slit. The approach of FIG. 4B is slightly more preferred over the approach of FIG. 4A because it does not interfere with the waveguiding and it does not affect the stiffness of the electrodes.

Note that the portion of the electrode corresponding to the dimension C (shown in FIG. 2) is intended to be slightly longer in FIG. 4A than in FIG. 2 while the overall width B of the electrode is intended to be the same in both Figures. This change results in the trenches being located within the dimension C (FIG. 4A) instead of outside the dimension C (FIG. 2). The increase in length of the dimension C in both the hot and ground electrodes by an amount at least equal to 2D on both ends minimizes the flexing of the electrodes about the minimum thickness portion of the electrodes having a dimension "J-H". This flexing can occur under the gas expansion generated within the gap "A" when the discharge is pulsed. Minimizing this flexing minimizes the change in the waveguide gap "A" dimension which in turn minimizes the variations in the lasers output beam performance parameters (i.e., such as output power stability, varying beam diameter dimensions, pointing stability, etc.).

To summarize some of the important aspects of this disclosure, the design includes placing trenches in the slab electrodes so that contact between the pulsed discharge and the ceramic strips is minimized thereby minimizing the generation of $Al_2O_3$ powder which shortens the life of the sealed off laser. Not having the inside edges of the ceramic strips in contact with the discharge also minimizes the generation of higher order waveguide modes thereby improving the laser beams specifications.

The ceramic strips are extended into the trench and past the outside edges of the electrodes so as to provide a larger impedance across the surfaces of the ceramic strips to ground than the impedance from the hot electrode to the ground electrode across the height of the trenches, thereby preventing the creation of a discharge in the trench. This improves the lasers' efficiency.

We have used gun-drilled channels within thick electrodes into which are inserted copper cooling tubes that are hydrostatically expanded to provide excellent heat transfer from the electrode through the copper and into the water cooling fluid.

To prevent the electrode gap spacing from varying appreciably in height under pulsed discharge conditions thereby causing a change in the waveguide portion of the hybrid resonator's performance and to minimize the rubbing of the aluminum and ceramic parts, pressure release ports are provided by holes drilled within the flat surfaces of either or both the hot and ground electrodes. A slightly more preferred approach of providing pressure release ports is to provide thin slits in the portion of the metal electrodes in contact with ceramic strips as shown in FIG. 4B. In the prior art, holes have been placed in electrodes of high pulsed rate convectively cooled excimer lasers where the gas flow gas is used to cool the laser gas. In the latter case gas is flowing into the discharge region to cool the gas while in our case gas is flowing out of the pressure release ports for the reasons discussed above. Also in our case, we use diffusion cooling via the electrodes to cool the gas. Pressure release ports have also been used in diffusion cooled RF excited slab lasers as described in the patents cited above as well as in U.S. Pat. No. 6,788,722 incorporated herein by reference.

While the subject invention has been described with reference to a preferred embodiment, various changes and modifications could be made therein, by one skilled in the art, without varying from the scope and spirit of the subject invention as defined by the appended claims.

What is claimed is:

1. A gas laser comprising:
a housing holding a lasing gas;
a pair of elongated electrodes having opposed planar surfaces, said electrodes being positioned in a spaced apart relationship to define a narrow gap therebetween, with an intermediate portion of the gap defining a slab shaped discharge region; and
a pair of elongated, planar dielectric plates positioned within the gap on opposite sides of the discharge region and wherein the planar surfaces of each electrode include a pair of elongated trenches at the opposed ends of the discharge region and spaced from the side edges of the electrodes, with the opposing trenches cooperating to define an open region having a width greater than the width of the gap between the electrodes and wherein the inner edges of the plates project into said open region so that the top and bottom surfaces of said inner edges of the plates are spaced from the electrodes.

2. A laser as recited in claim 1, wherein the outer edges of the plates extend beyond the outer edges of the electrodes.

3. A laser as recited in claim 1, wherein the dimensions and positions of the plates and trenches are arranged so that the surface impedance to ground of the plates is larger than the impedance between the electrodes.

4. A laser as recited in claim 1, wherein said electrodes include a plurality of pressure release ports extending from the side edges thereof into the adjacent trench.

5. A gas discharge laser comprising:
a housing holding a lasing gas;
a pair of elongated electrodes having opposed planar surfaces, said electrodes being positioned in a spaced apart relationship to define a narrow gap therebetween, with an intermediate portion of the gap defining a slab shaped discharge region; and
a pair of elongated, planar dielectric plates positioned within the gap on opposite sides of the discharge region, said electrodes include a plurality of pressure release ports extending from the side edges thereof into communication with the discharge region and wherein a portion of the bottom surface of the ports is defined by the surface of one of the planar dielectric plates.

6. A gas laser comprising:
a housing holding a lasing gas;
a pair of electrodes having opposed planar surfaces;
a pair of thin, planar dielectric plates positioned between the electrodes along the side edges thereof and defining a gap between the electrodes, with the inner edges of the plates extending partially into the gap and wherein the electrodes include a pair of elongated cut-out regions spaced from the side edges of the electrodes and aligned with the inner edges of the plates so that the top and bottom surfaces of the inner edges of the plates are spaced from the electrodes and wherein the portion of the gap between the electrodes located between the cut-out regions defines a slab shaped discharge region.

7. A laser as recited in claim 6, wherein the outer edges of the plates extend beyond the outer edges of the electrodes.

8. A laser as recited in claim 7, wherein the dimensions and positions of the plates and cut-outs are arranged so that the surface impedance to ground of the plates is larger than the impedance between the electrodes.

9. A laser as recited in claim 6, wherein said electrodes include a plurality of pressure release ports extending from the side edges thereof into the adjacent cut-out region.

10. A gas discharge laser comprising,
a housing holding a lasing gas;
a pair of electrodes having opposed planar surfaces;
a pair of thin, planar dielectric plates positioned between the electrodes along the side edges thereof and defining a gap between the electrodes, with an intermediate portion of the gap defining a slab shaped discharge region, wherein said electrodes include a plurality of pressure release ports extending from the side edges thereof into communication with the discharge region and wherein a portion of the bottom surface of the ports is defined by the surface of one of the planar dielectric plates.

* * * * *